(12) United States Patent
Kong et al.

(10) Patent No.: US 10,668,898 B2
(45) Date of Patent: Jun. 2, 2020

(54) WIPER SYSTEM FOR VEHICLE

(71) Applicants: HYUNDAI MOTOR COMPANY, Seoul (KR); KIA MOTORS CORPORATION, Seoul (KR)

(72) Inventors: Nak Kyoung Kong, Seongnam-Si (KR); Hyun Joong Pyun, Hwaseong-Si (KR); Seung Hyeok Chang, Suwon-Si (KR); Jong Min Park, Seoul (KR); Ki Hong Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/034,920

(22) Filed: Jul. 13, 2018

(65) Prior Publication Data

US 2019/0232922 A1    Aug. 1, 2019

(30) Foreign Application Priority Data

Feb. 1, 2018    (KR) .................... 10-2018-0012827

(51) Int. Cl.
| | |
|---|---|
| *B60S 1/56* | (2006.01) |
| *B60S 1/28* | (2006.01) |
| *B60S 1/18* | (2006.01) |
| *B60S 1/34* | (2006.01) |
| *G02B 27/00* | (2006.01) |

(Continued)

(52) U.S. Cl.
CPC . *B60S 1/56* (2013.01); *B60S 1/18* (2013.01); *B60S 1/28* (2013.01); *B60S 1/3447* (2013.01); *B60S 1/566* (2013.01); *G02B 27/0006* (2013.01); *B60R 1/001* (2013.01);

(Continued)

(58) Field of Classification Search
CPC ................... G02B 27/0006; G01N 2021/152; B60R 1/00; B60R 1/001; B60R 11/04; B60R 1/0602; B60S 1/08; B60S 1/56; B60S 1/566; B60S 1/62; B60S 1/0848; B60S 1/66; B60S 1/245; B60S 1/24; B60S 1/28; B60S 1/18
USPC ............ 15/250.29, 250.002, 250.003, 250.3, 15/250.15, 250.06, 250.07, 250.41
See application file for complete search history.

(56) References Cited

U.S. PATENT DOCUMENTS 3,320,627 A * 5/1967 Engel .................... B60S 1/0491
15/250.29
3,413,676 A * 12/1968 Engel ....................... B60S 1/20
15/250.27

(Continued)

FOREIGN PATENT DOCUMENTS

| DE | 2920118 | * 11/1980 |
|---|---|---|
| DE | 102016101745 | * 8/2017 |

(Continued)

*Primary Examiner* — Gary K. Graham
(74) *Attorney, Agent, or Firm* — Morgan, Lewis & Bockius LLP (57) ABSTRACT

A wiper system for a vehicle includes: a glass wiper disposed on a window glass of a vehicle; a motor providing driving power to the glass wiper; a camera capturing images of surroundings of the vehicle; and a camera wiper disposed on a camera lens of the camera and connected to the motor by a linkage to operate in association with the glass wiper such that the camera wiper swings back and forth over the camera lens while the glass wiper swings back and forth over the window glass.

7 Claims, 6 Drawing Sheets

(51) Int. Cl.
  *B60R 11/04* (2006.01)
  *B60S 1/08* (2006.01)
  *B60S 1/24* (2006.01)
  *B60R 1/00* (2006.01)
  *G01N 21/15* (2006.01)

(52) U.S. Cl.
  CPC ............ *B60R 11/04* (2013.01); *B60S 1/0848* (2013.01); *B60S 1/245* (2013.01); *G01N 2021/152* (2013.01)

(56) References Cited

U.S. PATENT DOCUMENTS

| | | | |
|---|---|---|---|
| 6,954,152 B1* | 10/2005 | Matthews | B60R 1/00 340/426.15 |
| 9,180,840 B2 | 11/2015 | Tanaka et al. | |
| 2005/0243172 A1* | 11/2005 | Takano | B60R 1/12 348/148 |
| 2015/0246660 A1 | 9/2015 | Seedall et al. | |
| 2015/0353024 A1 | 12/2015 | Cooper | |
| 2017/0080904 A1 | 3/2017 | Hsiao et al. | |
| 2017/0101062 A1* | 4/2017 | Kim | H04N 5/2253 |
| 2018/0201230 A1* | 7/2018 | Schafer | B60S 1/566 |

FOREIGN PATENT DOCUMENTS

| | | | |
|---|---|---|---|
| JP | 61-155043 | * | 7/1986 |
| JP | H05-338492 A | | 12/1993 |
| KR | 10-0169231 B2 | | 2/1999 |

* cited by examiner

[ Initial operating position ]

[ Maximum operating position ]

FIG. 7B

WIPER SYSTEM FOR VEHICLE

CROSS REFERENCE TO RELATED APPLICATION(S)

This application claims the benefit of Korean Patent Application No. 10-2018-0012827, filed on Feb. 1, 2018, which is hereby incorporated by reference in its entirety into this application.

TECHNICAL FIELD

The present disclosure relates generally to a wiper system for a vehicle, the wiper system providing a driver with a clean display for monitoring surroundings of the vehicle without monitoring the surroundings using side or room mirrors.

BACKGROUND

Generally, it is important for a driver to securely monitor side and rear surroundings of a vehicle when the driver tries to perform a lane change or backing of the vehicle in order to prevent a traffic accident.

For a lane change or backing of a vehicle, a driver generally conducts such operations after monitoring the side and rear surroundings of the vehicle using side and room mirrors and determining that there are no obstacles around the vehicle.

However, inexperienced drivers are not used to checking the side and rear surroundings using the side and room mirrors, thereby resulting in the risk of traffic accidents being caused.

To solve this problem, a related art discloses a camera unit which includes a camera provided on a rear side of a vehicle to take images of the side and rear surroundings of the vehicle, and a monitor provided on an interior of the vehicle to display the images for monitoring of the surroundings of the vehicle. However, when a vehicle is driven in muddy environment or rainy weather, for example, a camera lens may be contaminated with foreign substances, making it impossible for the camera unit to provide a clean display.

Further, particularly for a content management system (CMS) monitoring all of a front, sides, and rear surroundings of a vehicle, a separate driving unit has to be provided to remove foreign substances dirtying the camera lens, causing increased manufacturing cost and complex configuration of the CMS system.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and an object of the present disclosure is to propose a wiper system for a vehicle, in which a glass wiper and a camera wiper are operated in association with each other using a single driving unit.

Further, another object of the present disclosure is to provide a wiper system for a vehicle, wherein the wiper system includes a linkage unit having a plurality of links to allow operating angles of a glass wiper and a camera wiper to be associated with each other.

An object of the present disclosure is not limited to the above-mentioned objects, and other objects will be understood by reading embodiments described in the following description.

Further, the objects of the present disclosure may be implemented by means and a combination thereof set forth in the appended claims.

According to one aspect of the present disclosure, a wiper system for a vehicle includes: a glass wiper disposed on a window glass of a vehicle; a motor providing driving power to the glass wiper; a camera capturing images of surroundings of vehicle; and a camera wiper provided on a camera lens of the camera and connected to the motor by a linkage to operate in association with the glass wiper such that the camera wiper swings back and forth over the camera lens while the glass wiper swings back and forth over the window glass.

The linkage may have a first arm, a second arm, a third it, and a fourth arm, which are connected together, wherein the first arm is fixed to a central shaft of the motor to pivot on the central shaft, the second arm is connected to an end of the first arm, the third arm is connected to an end of the second arm, with the camera wiper fixed thereto, and the fourth arm is connected to a connection between the second and third arms so as to pivot in association with the first arm.

One end of the fourth arm may be fixed to a second shaft between the camera lens and the central shaft.

The fourth arm may be configured to pivot on the second shaft.

The linkage may be provided between the camera and the window glass.

The camera wiper may be configured to move along a guide part in proximity to the camera lens.

The wiper system may further include a camera cover covering the camera.

The camera wiper may be configured to swing back and forth over the camera lens within a predefined angle range in association with the operation of the glass wiper.

According to the present disclosure, the wiper system has following effects with correlation of combination and use of elements described in embodiments of the present disclosure.

Further, the wiper system facilitates removal of foreign substances contaminating the camera lens, having an effect of providing clean images of surroundings of a vehicle.

Further, the wiper system operates the glass wiper and the camera wiper together in association with each other using a single driving unit, thus having an economical effect because a separate driving unit for the camera wiper is not required.

Further, the wiper system operates in association with the operation of the glass wiper, thus having an economical effect of being applicable to all kinds of vehicles having a window glass.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION

Hereinbelow, preferred embodiments of the present disclosure will be described in detail with reference to the accompanying drawings. The scope of the present disclosure may be embodied in many different forms and is not limited to embodiments described in the following description. The embodiments described in the following description are provided to allow an ordinary person in the art to more completely understand the present disclosure.

As used herein, a term "unit", "shaft", "arm", "portion", or the like means a unit section capable of performing at least one function or operation, which unit section may be implemented by hardware-to-hardware coupling.

As used herein, terms "first", "second", "third", "fourth", and the like are used to distinguish between some parts of the same object, the terms being not necessarily limited to the order as listed in the following description. Elements referred to as a wiper herein may respectively include blades on their bottom surfaces disposed on a window glass or a camera lens. The window glass may include rear glass of a vehicle, a windshield glass, or together with a windscreen glass.

According to an exemplary embodiment of the present disclosure, a wiper system for a vehicle includes a glass wiper 110 provided on a window glass 100, and a camera 200 provided on a lower side of the window glass 100 to take images of surroundings of the vehicle.

The camera 200 includes a camera module, a camera lens 250, and camera cover 260, and a camera wiper 210 is provided opposite to the camera lens 250.

The camera 200 is provided on the lower side of the window glass 100 in proximity to a central shaft (first shaft) 220 about which the glass wiper 110 pivots.

A motor is provided inside of a vehicle to drive the glass wiper 110, such that the motor is fixed to one side of the glass wiper 110 pivoting over the window glass 100. A controller controls the motor to be applied with a voltage to enable the glass wiper 110 to pivot within a pivot range over the window glass 100.

The controller may be configured to drive the glass wiper at multi-stage driving speed in response to a user's demand, so that the driving speed of the glass wiper may be set to be different depending on the magnitude of the voltage applied to the motor.

Figure 1:
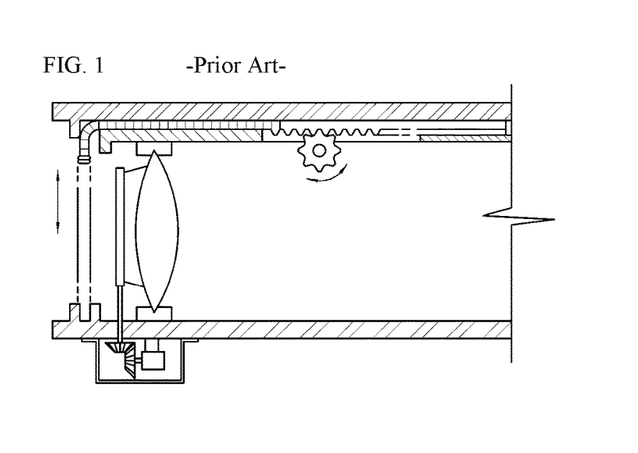
FIG. 1 is a view illustrating a conventional configuration of a camera imaging surroundings of a vehicle.
Figure 2:
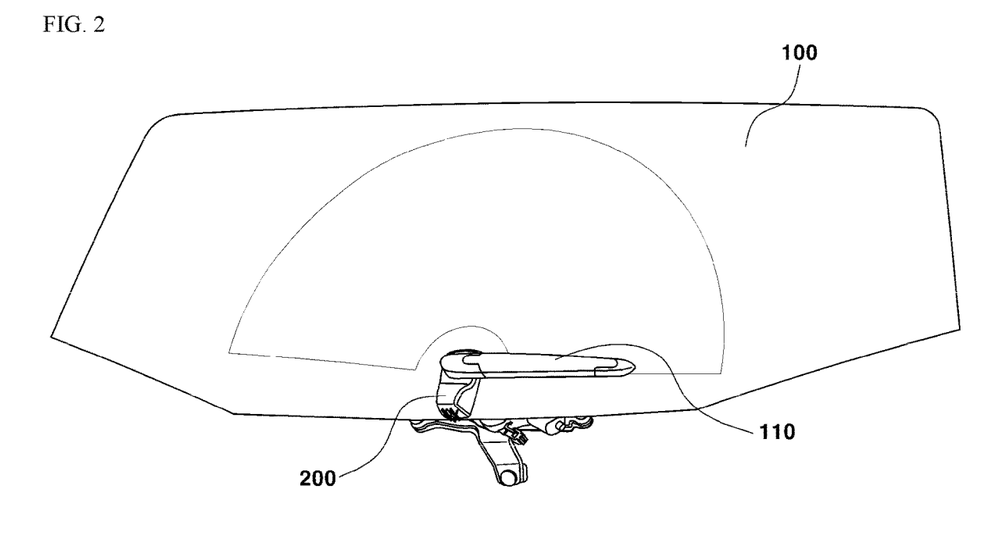
FIG. 2 is a view illustrating a configuration of a wiper system for a vehicle according to an embodiment of the present disclosure.

FIG. 2 illustrates the configuration of the wiper system provided on the window glass.

The window glass 100 for providing a surrounding view of a vehicle is inclined at a predefined angle in a vertical direction of the vehicle, and the glass wiper 110 is pivotably provided over the window glass 100.

The controller is configured to drive the glass wiper 110 in response to a user's demand by supplying electric power to the motor, which is provided on a vehicle body or a back surface of the window glass 100.

The glass wiper 110 is fixed to the motor such that the glass wiper reciprocatingly pivots over the window glass 100 depending on a driving angle of the motor.

According to the present disclosure, the camera wiper 210 is provided opposite the camera lens 250 such that the camera wiper 210 operates in association with the driving power of the motor driving the glass wiper 110.

Figure 3:
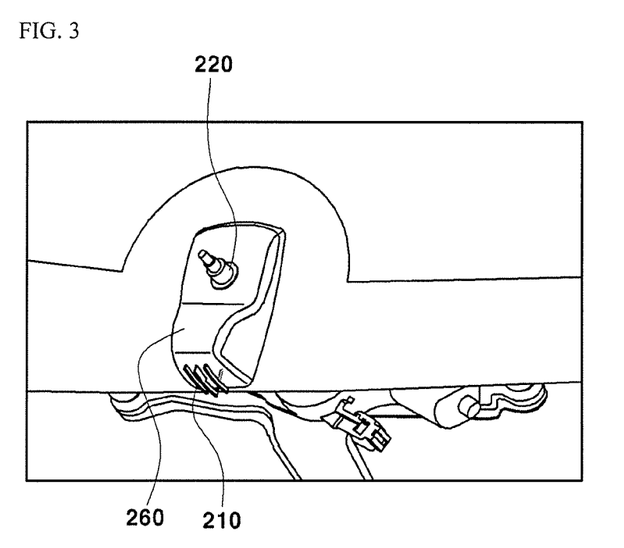
FIG. 3 is an enlarged view illustrating a camera of the wiper system according to an embodiment of the present disclosure.

FIG. 3 is an enlarged view of the camera 200, wherein the camera wiper 210 is configured to operate in association with a driving shaft of the glass wiper 110.

The camera 200 is provided on a lower side of the window glass 100, and includes the camera module provided inside of the camera cover 260 and the camera lens 250 on a distal end of the camera module.

Further, the camera 200 includes a central shaft (first shaft) 220 which passes through the camera cover 260 to transmit the driving power of the motor. The central shaft (first shaft) 220 may include all of connection members for transmitting the driving power of the motor.

The glass wiper 110 is fixed to the central shaft (first shaft) 220 so as to receive the driving power from the motor which is disposed on a vehicle body or on the back side of the window glass 100. The camera wiper 210 is also provided, which operates in association with the operation of the glass wiper 110.

The glass wiper 110 is designed to move over the surface of the window glass 100 as the central shaft (first shaft) 220 moves, and the camera wiper 210 is designed to be connected to the central shaft (first shaft) 220 by means of the linkage mechanism 230, such that the camera wiper moves over the surface of the camera lens 250 in association with the operation of the glass wiper 110.

The linkage mechanism 230 is designed to compensate for a difference between operating angles of the glass wiper 110 and the camera wiper 210. According to an embodiment of the present disclosure, the glass wiper 110 is designed to pivot at 170 degrees from an initial operating position, and the camera wiper 210 is designed to pivot at a preset operating angle in response to respective lengths of the arms 231, 232, 233, 234 of the linkage mechanism and a position of a second shaft 270. Here, the pivot angle of the camera wiper 210 may be set to a range between 40 degrees and 90 degrees depending on the size of the camera lens.

The camera wiper 210 may have a different pivot angle according to positional relationship of the linkage mechanism, the first shaft, and the second shaft 270.

Figure 4:
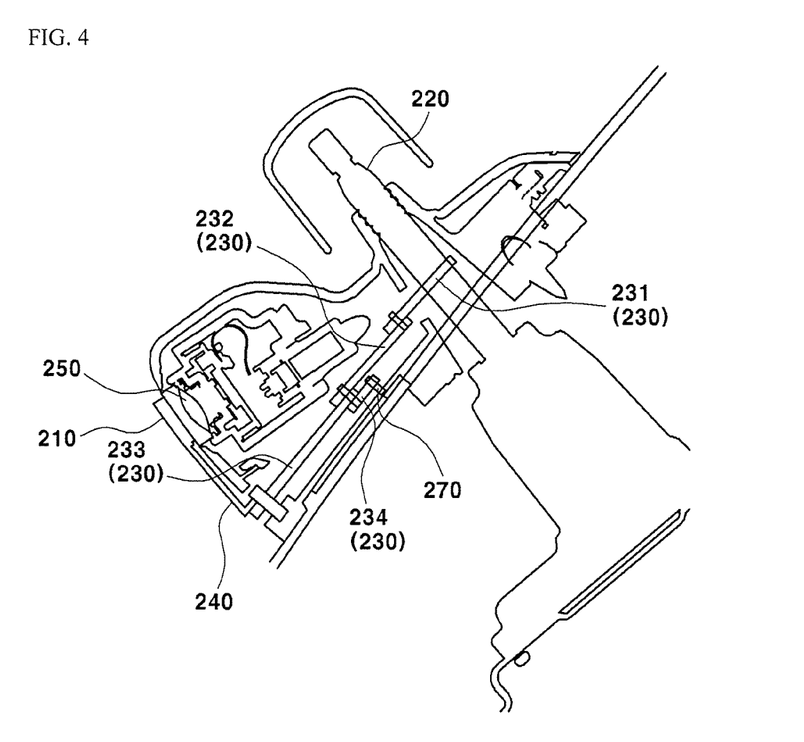
FIG. 4 is a side cross-sectional view illustrating the camera according to an embodiment of the present disclosure.

FIG. 4 is a side cross-sectional view of the wiper system for a vehicle, wherein a camera 200 and a linkage mechanism 230 are provided in a vertical direction of the window glass 100.

As shown, the camera 200 includes a camera cover 260, a camera module, and a camera lens 250. The camera cover 260 has a structure for externally protecting the camera module and the camera lens 250.

The camera module may take images of surroundings of a vehicle in association with an around view monitoring system (AVM), or a rear view monitoring system (RVM) in response to a user's request.

The camera lens 250 on a distal end of the camera module is positioned towards the outside of a vehicle, and is designed to move in a vertical direction according to a user's request.

The camera wiper 210 is designed to be brought into contact with the camera lens 250 such that the camera wiper is positioned at a specified angle in the vertical direction of the window glass 100, and the camera wiper may move over the camera lens 250, along with the motion of the camera module.

The camera wiper 210 is designed to move over the surface of the camera lens 250 along a guide part 240 provided at a distal end of the camera cover 260. The guide part 240 serves to guide the operating position of the camera wiper 210.

The linkage mechanism 230 is positioned between the camera 200 and the window glass 100 such that the linkage mechanism is connected to the central shaft (first shaft) 220. The linkage mechanism is designed to move over the window glass 100 in order to drive the camera wiper 210 in association with the driving power of the glass wiper 110.

At least one arm of the linkage mechanism 230 may be designed to be fixed to the central shaft (first shaft) 220 to which the driving power is applied from the motor, and other alms may be positioned such that the camera wiper 210 is fixed thereto.

As such, since the glass wiper 110 is driven along with the rotation of the central shaft (first shaft) 220, and the camera wiper 210, which is connected by means of the linkage mechanism 230, is simultaneously driven, the wiper system for a vehicle can clean the window glass 100 and the camera lens 250 with the driving power from a single driving source.

Further, the linkage mechanism 230 serves to compensate for an operating angle so as to provide the operating angle of the camera wiper 210, which is smaller than the operating angle of the glass wiper 110.

Figure 5:
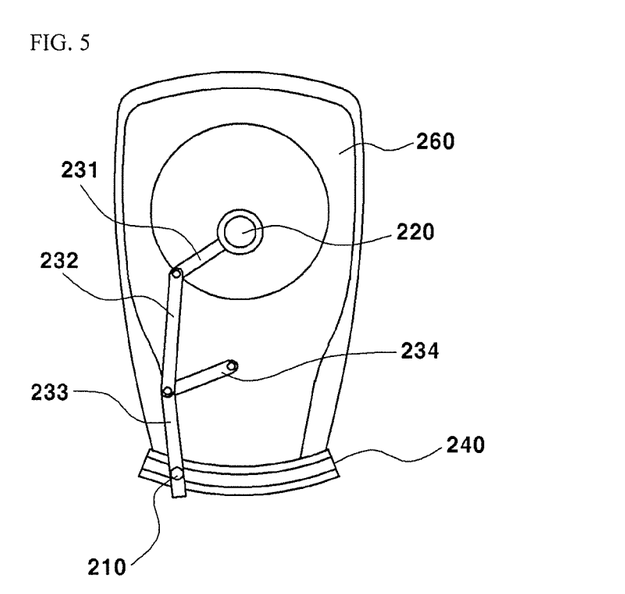
FIG. 5 is a front cross-sectional view illustrating the camera according to an embodiment of the present disclosure.

FIG. 5 is a front cross-sectional view of the camera 200, wherein the linkage mechanism 230 operates in association with the operation of the central shaft (first shaft) 220.

In an embodiment, the linkage mechanism 230 consists of first to fourth arms 231, 232, 233, 234, wherein the first arm 231 is fixed to the central shaft (first shaft) 220 to apply the driving power, the second atm 232 is positioned between the first arm 231 and the third arm 233, and the third arm 233 is provided such that a first end thereof is connected to the second arm 232 and a second end thereof is fixed to the camera wiper 210.

The fourth atm 234 is provided such that a first end thereof is pivotally connected to a connection between the second arm 232 and the third arm 233, and a second end thereof is fixed at a proper position on a reference line connecting the central shaft (first shaft) 220 and the camera lens 250.

Thus, as the first arm 231 pivots at a specified angle about the central shaft (first shaft) 220, the fourth arm 234 can pivot on the second shaft 270 on the reference line connecting the central shaft (first shaft) 220 and the camera lens 250.

Further, the camera wiper 210 is designed to move over the camera lens 250 by means of the second arm 232 and the third arm 233, which are designed to operate in association with the operation of the first arm 231 and the fourth arm 234. The camera wiper 210 may be designed to move along the guide part 240 within a predefined motion range.

As such, the first arm 231 has the first end fixed to the central shaft (first shaft) 220, the fourth arm 234 is fixed to the second shaft 270 on the reference line connecting the central shaft (first shaft) 220 and the camera lens 250, so as to restrict the motion of the second arm 232 and the third arm 233.

As described before, the camera wiper 210 is designed to pivot over the camera lens 250 as the glass wiper 110 reciprocally pivots at a specified angle, by the linkage mechanism 230 having the first to fourth arms 231, 232, 233, 234.

The glass wiper 110 may have an operating angle of the central shaft (first shaft) 220 amounting to 170 degrees, and the camera wiper 210 operating in association with the glass wiper 110 may have an operating angle which amounts to a half of the operating angle of the glass wiper 110. Preferably, the operating angle of the glass wiper 110 amounts to 170 degrees about the central shaft (first shaft) 220, whereas the operating angle of the camera wiper 210 amounts to 40 degrees to 90 degrees about the central shaft (first shaft) 220 depending on the lengths of the arms (231, 232, 233, 234) of the linkage mechanism and the position of the second shaft 270.

Figure 6A:
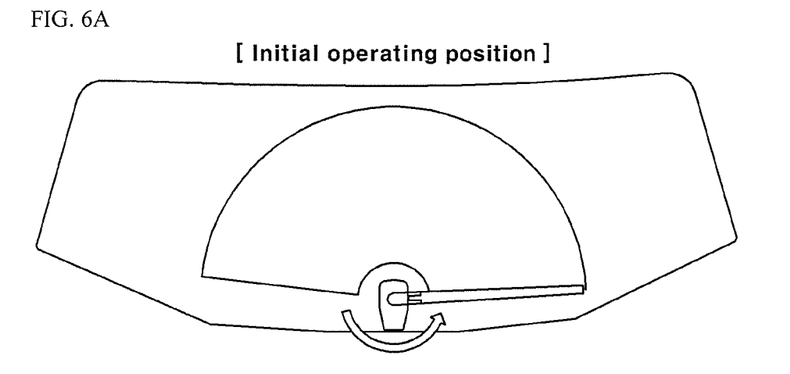
FIGS. 6A and 6B are views illustrating the wiper system at an initial operating stage according to an embodiment of the present disclosure.
Figure 6B:
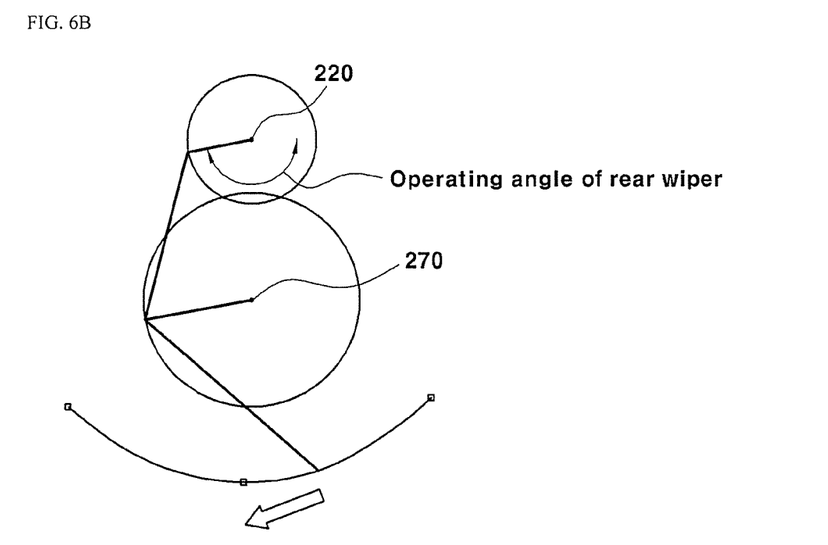
Figure 7A:
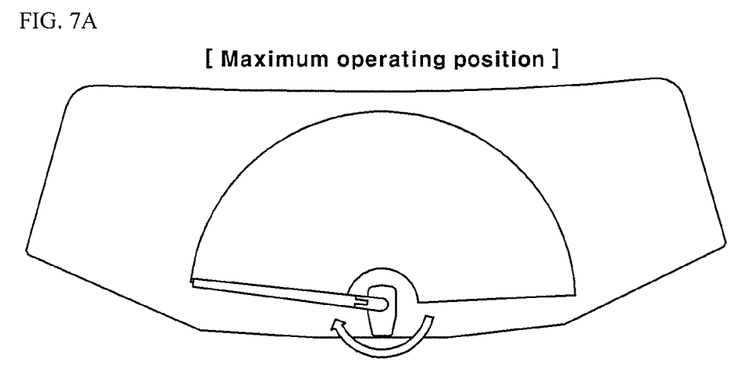
FIGS. 7A and 7B are views illustrating the wiper system at maximum operating angle according to an embodiment of the present disclosure.
Figure 7B:
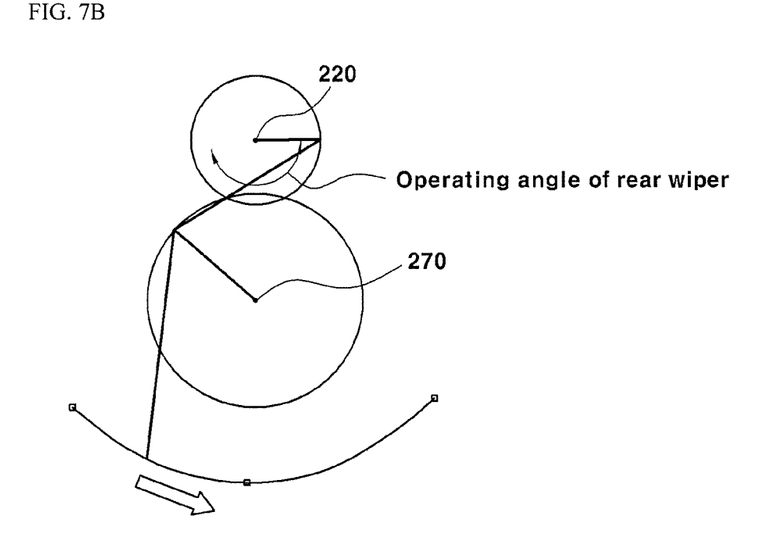

FIGS. 6A and 6B illustrate correlation between the linkage mechanism 230 and the glass wiper 110 at an initial operating stage of the glass wiper 110, and FIGS. 7A and 7B illustrate the correlation between the glass wiper 110 and the linkage mechanism 230 at a maximum operating angle of the glass wiper 110.

As illustrated in FIGS. 6A and 6B, the glass wiper is first positioned at a lower side on the right of the window glass 100, and the camera wiper 210, which is connected to the glass wiper by means of the linkage mechanism 230, is also positioned at one side on the right of the camera lens 250.

When the motor is supplied with power from a battery module (not shown) positioned in a vehicle body by the controller, the central shaft (first shaft) 220 first rotates in a counterclockwise direction so that the glass wiper 110 also pivots in the counterclockwise direction.

Then, the first arm 231, which is connected to the central shaft (first shaft) 220, also rotates in the counterclockwise direction, so that, at an initial operating stage of the glass wiper, when the central shaft (first shaft) 220 rotates in the counterclockwise direction, the first arm 231 rotates in the counterclockwise direction, and thus the first end of the first arm 231 moves to its lowest level, the camera wiper 210 moves (operating angle of about 5 to 10 degrees) to the right (in the counterclockwise direction) of the camera lens 250, and if passing the lowest level, rotates in the clockwise direction along the guide part.

FIGS. 7A and 7B also illustrate the case in which the glass wiper 110 moves from the maximum operating angle to an initial operating state, wherein as the central shaft (first shaft) 220 connected to the motor rotates in the clockwise direction, the glass wiper 110 pivots in the clockwise direction over the window glass 100.

Since the first arm 231 is provided such that the first end thereof is fixed in association with the operation of the central shaft (first shaft) 220, the first arm moves in the same direction as the central shaft (first shaft) 220, and the camera wiper 210 positioned at a distal end of the third arm 233 moves in the counterclockwise direction.

As the motor is supplied with electric power so that the glass wiper 110 pivotally reciprocates from an initial operating position and the maximum operating angle, the camera wiper 210 can pivotally reciprocate over the camera lens 250 by means of the linkage mechanism 230 connected to the central shaft (first shaft) 220 fixed to the motor.

The foregoing description illustrates preferred embodiments of the present disclosure. However, the present disclosure may have different combination, change, and modification of the disclosed embodiments. Although preferred embodiments of the present disclosure have been described for illustrative purposes, those skilled in the art will appreciate that various modifications, additions and substitutions are possible, without departing from the scope and spirit of the invention as disclosed in the accompanying claims.

What is claimed is:

1. A wiper system for a vehicle, the wiper system comprising:
    a glass wiper disposed on a window glass of the vehicle;
    a motor providing driving power to the glass wiper;
    a camera capturing images of surroundings of the vehicle; and
    a camera wiper disposed on a camera lens of the camera and connected to the motor by a linkage to operate in association with the glass wiper such that the camera wiper swings back and forth over the camera lens while the glass wiper swings back and forth over the window glass,
    wherein the linkage includes a first arm, a second arm, a third arm, and a fourth arm, which are connected together,
    wherein the first arm is connected with a central shaft of the motor to pivot on the central shaft,
    wherein the second arm is connected to an end of the first arm,
    wherein the third arm, to which the camera wiper is attached, is connected to an end of the second arm, and
    wherein the fourth arm is connected to a connection point, at which the second and third arms are connected, to pivot in association with the first arm.

2. The wiper system according to claim 1, wherein one end of the fourth arm is fixed to a second shaft, between the camera lens and the central shaft.

3. The wiper system according to claim 2, wherein the fourth arm is configured to pivot on the second shaft.

4. The wiper system according to claim 1, wherein the linkage is located between the camera and the window glass.

5. The wiper system according to claim 1, wherein the camera wiper is configured to move along a guide part in proximity to the camera lens.

6. The wiper system according to claim 1, further comprising a camera cover covering the camera.

7. The wiper system according to claim 1, wherein the camera wiper is configured to swing back and forth over the camera lens within a predefined angle range in association with the glass wiper.

* * * * *